(12) United States Patent
Phelan et al.

(10) Patent No.: US 6,705,440 B2
(45) Date of Patent: *Mar. 16, 2004

(54) CABLE STAY DAMPER BAND AND METHOD OF USE FOR REDUCTION OF FLUID INDUCED CABLE VIBRATIONS

(75) Inventors: R. Scott Phelan, Lubbock, TX (US); Partha P. Sarkar, Ames, IA (US); Kishor C. Mehta, Lubbock, TX (US); Thomas B. Gardner, Baltimore, MD (US); Zongshan Zhao, Katy, TX (US)

(73) Assignee: Texas Tech University, Lubbock, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 10/134,701

(22) Filed: Apr. 30, 2002

(65) Prior Publication Data

US 2002/0170792 A1 Nov. 21, 2002

Related U.S. Application Data

(63) Continuation-in-part of application No. 09/738,346, filed on Dec. 18, 2000, now Pat. No. 6,435,323, which is a continuation-in-part of application No. 09/643,754, filed on Aug. 23, 2000, now Pat. No. 6,386,526.
(60) Provisional application No. 60/171,094, filed on Dec. 16, 1999, and provisional application No. 60/149,917, filed on Aug. 23, 1999.

(51) Int. Cl.[7] ................................................. F16F 7/10
(52) U.S. Cl. .................... 188/378; 188/267.1; 188/268; 188/381; 267/136; 174/42

(58) Field of Search ............................. 267/136, 140.15, 267/140.14; 188/378, 268, 267.1, 381; 174/42, 40 R; 14/22, 243

(56) References Cited

U.S. PATENT DOCUMENTS

| 378,697 A | 2/1888 | Lindenthal |
| 2,154,442 A | 4/1939 | Diehl |
| 2,155,052 A | 4/1939 | Byland |
| 2,469,167 A | 5/1949 | Little |

(List continued on next page.)

FOREIGN PATENT DOCUMENTS

| JP | 10-168815 A | * | 6/1998 |
| JP | 11-172618 A | * | 6/1999 |

Primary Examiner—Jack Lavinder
Assistant Examiner—Mariano Sy
(74) Attorney, Agent, or Firm—Jones, Tullar & Cooper PC

(57) ABSTRACT

Fluid current induced vibrations, as well as vortex shedding vibrations induced in a cable stay or a similar elongated, cylindrical element are dampened and substantially eliminated by applying a plurality of flexible active or passive damper bands to the cable at spaced intervals. In underwater currents, the damper bands force or channel the fluid flow over a circular cross-sectional shape, which inhibits lift, and therefore damps the cable stay oscillations. These damper bands can be retrofit to existing cables or can be installed on new cables. Each damper band may include a shiftable mass and an energizing device for facilitating assisted shifting of the mass. A control assembly can actuate all or selected ones of the energizing devices in response to sensed magnitudes of cable stay vibration.

16 Claims, 11 Drawing Sheets

U.S. PATENT DOCUMENTS

| | | |
|---|---|---|
| 2,714,161 A | 7/1955 | Featherstun |
| 2,889,011 A | 6/1959 | Weaver |
| 2,969,416 A | 1/1961 | McGavern |
| 3,246,073 A | 4/1966 | Bouche et al. |
| 3,378,631 A | 4/1968 | Edwards |
| 3,388,208 A | 6/1968 | Liberman et al. |
| 3,553,345 A | 1/1971 | Edwards |
| 3,581,449 A | 6/1971 | Huber |
| 3,733,923 A | 5/1973 | Goodrich et al. |
| 3,780,207 A | 12/1973 | Crosby et al. |
| 3,826,339 A | 7/1974 | Brokaw |
| 3,991,550 A | 11/1976 | Cohen |
| 3,992,566 A | 11/1976 | Kerimov et al. |
| 4,090,168 A | 5/1978 | Miller et al. |
| 4,246,937 A | 1/1981 | Müller |
| 4,482,136 A | 11/1984 | Wolf et al. |
| 4,549,035 A | 10/1985 | Zaltsberg |
| 4,569,708 A | 2/1986 | Tanaka et al. |
| 4,612,680 A | 9/1986 | Daiguji |
| 4,620,060 A | 10/1986 | Perinetti |
| 4,706,788 A | 11/1987 | Inman et al. |
| 4,995,583 A | 2/1991 | De La Fuente |
| 5,005,678 A | 4/1991 | Julien et al. |
| 5,173,982 A | 12/1992 | Lovett et al. |
| 5,735,257 A | 4/1998 | Walk |
| 5,801,329 A | 9/1998 | Schmidt |
| 5,857,712 A | 1/1999 | Kato |
| 6,096,971 A | 8/2000 | Hull |
| 6,131,873 A | 10/2000 | Blazon et al. |
| 6,138,309 A | 10/2000 | Tadros et al. |
| 6,138,998 A | 10/2000 | Parker et al. |
| 6,292,967 B1 | 9/2001 | Tabatabai et al. |
| 6,386,526 B1 | 5/2002 | Sarkar et al. |
| 6,435,323 B2 * | 8/2002 | Phelan et al. ............... 188/378 |

* cited by examiner

CABLE STAY DAMPER BAND AND METHOD OF USE FOR REDUCTION OF FLUID INDUCED CABLE VIBRATIONS

CROSS-REFERENCE TO RELATED APPLICATION

The subject patent application claims the benefit of U.S. Provisional Application Serial No. 60/149,917, which was filed on Aug. 23, 1999. The disclosure of that provisional patent application is hereby incorporated herein by reference. The subject patent application also claims the benefit of U.S. Provisional Application Serial No. 60/171,094, which was filed on Dec. 16, 1999. The disclosure of that provisional application also is hereby incorporated herein by reference. The subject patent application is a continuation-in-part of U.S. patent application Ser. No. 09/643,754, filed Aug. 23, 2000. which is now U.S. Pat. No. 6,386,526. The disclosure of that patent application is also hereby incorporated herein by reference. The subject patent application is also a continuation-in-part of U.S. patent application Ser. No. 09/738,346, filed Dec. 18, 2000. which is now U.S. Pat. No. 6,435,323. The disclosure of that patent application is also hereby incorporated herein by reference.

FIELD OF INVENTION

The present invention is directed generally to a cable stay damper band and to its method of use. More specifically, the present invention is directed to a cable stay damper band that is usable with both new cables and as a retrofit to existing cables. Most particularly, the present invention is directed to cable stay damper bands that are securable to cable stays in an application pattern which significantly reduces fluid current induced, or other induced, vibrations in the cable. The cable stay damper bands are structured to be attached to or placed about both new cables as well as existing cables in a particular pattern or array. These cable stay damper bands can also be incorporated into the cable stay at the time of manufacture in order to eliminate the need for a later retrofit. Vibrations can be induced in a cable by the passage of any fluid, such as air or water, over the surface of a cable. The use of damper bands in accordance with the present invention has been very effective in the substantial reduction and near elimination of wind/rain induced vibrations in cable stays in air. Similarly, damper bands in accordance with the present invention can have a significant effect in the reduction of vibrations or oscillations induced in an underwater cable as a result of relative movement between the cable and the fluid; i.e. water in which the cable is placed. The damper bands, if intended to be placed on the exterior of the cable, have a circular, or ringed shape that will counteract these fluid passage induced vibrations in the cable stay generated by the relative movement of the cable and the fluid which surrounds it.

The damper bands can be either passive or active. Passive damper bands will function without any mechanical or electrical input. Active damper bands can be reactive or proactive and include movable masses. These movable masses can be caused to move in reaction to cable induced vibrations and are thus reactive. They can also be caused to shift by either mechanical or electrical devices and are thus proactive. The proactive damper bands with actuating devices can be considered to be computer-controlled devices. In the case of active damper bands, these can either form the generalized ring or ribbed shape on the cable stay exterior surface, or they can be embedded within the cable stay, thus, leaving a smooth outer cable stay surface. Typically, the distributed bands or rings will be placed along the full length of the cable stay. It is also possible for only a partial length of the cable, e.g. the top third or top quarter of cable stay length, to have the distributed damping devices attached.

The implementation of an active, smart underwater cable vibration damping system is included in the present invention. The active underwater system of the present invention employs distributed bands or rings together with small, embedded mechanical dampers, such as shiftable media, pendulums, and/or spring type inertial masses that may be energized using active smart control when the cable vibration reaches a threshold limit. Due to the extreme depths at which underwater cables, which can receive the damper bands of the present invention, are mounted, efforts in active smart control are focused on low-maintenance damping techniques and low-cost cable modifications.

DESCRIPTION OF THE PRIOR ART

The use of cable stays in the construction of a wide variety of structures is well known. Any number of types of bridges use various cables to support bridge decks, to hold bridge towers steady and to generally form the support for the bridges. Suspension bridges are one example of a bridge structure that uses a large number of elongated cables as stays and supports. In a somewhat similar manner, cables are frequently used as guy wires or as stays in connection with tall antenna towers and the like. A large number of these towers are used to support various receivers, repeaters and other similar assembles. One need not look far without seeing such a tower. A plurality of elongated cables are typically run from various elevations on these towers to suitable ground anchors. These cable stays or guy wires are used to stabilize the tower.

Elongated cables are also utilized in the underwater stabilization of off-shore structures such as floating oil drilling installations. These cables are subjected to hydro-dynamic forces that are very similar to the aerodynamic forces which above ground stay cables and guy lines experience. A much slower fluid flow speed in water is capable of producing cable stay vibrations found generally only with very high wind speeds, i.e. low water speeds generally correspond to fluid flow in high air speeds.

In all of these cable applications, the passage of a fluid, such as air or water, over the surface of the cable, can induce vibrations or oscillations in the cable. If the fluid velocity is sufficient, the cable can be seen to vibrate at node points with sufficient amplitude that the structure with which the cable is associated may be damaged. In the case of cable stays for use with off-shore structures, the off-shore structural stays may be caused to vibrate or in extreme situations to shake sufficiently that the structural integrity of the off-shore structure may be compromised. Such vibrations can also cause fatigue in the cables. It is relatively common knowledge that fatigue in off-shore oil platforms, due primarily to underwater currents, is a problem. Such cable stay vibrations can be severe and have led to concerns that they are contributing to significant fatigue loads on the cables. At risk is the material that makes up the cable stay itself, as well as the anchorage devices. Such fatigue problems can lead to the need for early replacement of the cables. In the situation involving sub-sea cables, the position of the anchored platform can be affected with a resultant possible misalignment of platform supported drill strings and other similar downhole implements.

For cable stays in air, it has been proposed to provide various mechanical vibration dampers for elongated cables.

In one configuration, these vibration dampeners have taken the form of shock absorber-like devices that may be interposed between an end of the cable and an anchoring or attachment site for the cable. Other similar spring-biased connections have been used in the past in an effort to compensate for or to counteract wind induced vibrations and oscillations.

Fairings and streamlining devices have been applied to overhead cables, to sub-sea cables and to guy wires and cable stays. These attempt to altar the shape of the generally cylindrical cable to create an airfoil or flow-smoothing shape.

Various forms of underwater surface treatments have been sought to serve as solutions to the vibrations of the smooth-surfaced, circular cable. While some of these treatments can be adopted only at the cable design stage, others are feasible for retrofitting of the cables. Fluid dynamic countermeasures usually modify the surface of the cable cross section to improve its fluid dynamic performance in terms of reducing the excitation from the moving fluid, e.g. water, or increasing the fluid dynamic damping. Two examples of generally known types of underwater cable surface/cross section modifications are surface dimpling and parallel axial protuberances.

It is also known in the art to fabricate structures with integrally formed annular rings and with various projections and protrusions. In these structures, the rings are formed during the fabrication of the structure, which may be a mast of an outdoor antenna, a smokestack, transmission lines or pipelines. These rings are intended to reduce or to eliminate the vortex shedding which affects structures of these types. The elimination of this vortex shedding will greatly reduce the oscillating lateral forces which smokestacks, antennas, transmission lines and other cylindrical structure have been plagued by due to this periodic shedding of vortices.

The prior art has appreciated the use of various vibration dampers and integrally formed annular rings and bands as well as various fairings and spoilers. However, there continues to exist a need for cable stay dampers and for their method of use and application which will reduce or mitigate fluid induced cable vibrations and which will overcome the limitations of the prior art devices.

SUMMARY OF THE INVENTION

It is an object of the present invention to provide a cable stay damper band.

Another object of the present invention is to provide a method of using passive and active cable stay damper bands.

A further object of the present invention is to provide passive and active cable stay damper bands for retrofit use.

Still another object of the present invention is to provide a passive or active cable stay damper band which is effective in counteracting fluid current induced vibrations in cables positioned in air and in water.

Yet a further object of the present invention is to provide a passive or active cable stay damper band which damps both low and high modal vibrations.

Even still another object of the present invention is to provide a passive or active cable stay damper band which is economical to use and which is easily attached.

A further object of the present invention to provide a passive or active smart control system for cable stay fluid flow vibration mitigation using distributed circular bands or rings, where the outside surface of the cable stay has a resulting ribbed shape.

Still a further object of the present invention is to provide a smart control system of fluid flow induced vibration mitigation using damper bands with embedded mechanical dampers, where the outside surface of the cable stay retains a smooth shape.

Yet another object of the present invention is to provide fluid flow vibration mitigating damper bands or rings having embedded mechanical dampers that are energized using active smart control when cable vibrations reach a threshold value.

As will be set forth in greater detail in the description of the preferred embodiments which are presented subsequently, the fluid flow cable stay damper bands in accordance with the present invention, and their method of use are primarily intended to mitigate fluid flow induced vibrations in cable stays of structures. The present invention is directed to the mitigation of air current and underwater current induced vibrations of cable stays in structures such as bridges, towers, masts, off-shore oil platforms and the like.

The distributed fluid-dynamic and mechanical damping of vibrations induced in air or underwater situated cables through the utilization of active smart control, in accordance with the present invention, utilizes a plurality of damper bands or rings that are positionable at spaced lengths along the cable stay to be dampened. Each damper band, other than an active, embedded band, has an outer, fluid-dynamic shape and a hollow or partially hollow interior. The interior of each damper band is provided with active mechanical dampers. These can take the form of shiftable weights, pendulums, spring type inertial masses and other movable or shiftable bodies. In one embodiment of the present invention, these active, shiftable masses are characterized as active, smart masses. This means that they are caused to shift by a control system that senses cable vibrations or oscillations above a threshold level and then activates the shiftable masses in a manner which will effectively counteract the cable or cable stay vibrations or oscillations.

The existence of underwater current induced vibrations in cable stays is a phenomenon that possibly can be counteracted by properly designing the stay cables of a marine structure before it is erected. Unfortunately, there has not, in the prior art, been a practical retrofit solution for off-shore platforms and for the platform's associated cable stays which are already in place.

The fluid flow cable stay dampers bands, and their method of usage, in accordance with the present invention, provide an effective, cost efficient solution to the problem of air and underwater cable stay vibration. The cable stay damper bands utilize flexible or rigid cable encircling bands which carry embedded or attached tension straps. The cable encircling bands can be placed about existing cables in the field without taking the structure, such as a bridge or an off-shore oil platform out of service and without the need for large amounts of specialized equipment.

The damper bands can be either passively or actively controlled. For actively controlled bands, they can be fixed external to the cable stay, producing a "ribbed" surface, or can be embedded within the cable stay, leaving a smooth surface.

The system of fluid-dynamic and mechanical damping of cables with active smart control, in accordance with the present invention, provides superior damping of cable stay vibration with less cable fatigue. It also will reduce the number of required air or underwater damper bands or rings required for each cable. The active smart control system of the present invention is directed primarily for use with a distributed air or underwater ring or band system. It is also usable for a computer-controlled single point mechanical damper system which could be used either by itself, or in combination with an underwater ring or damper band system.

For a distributed mitigation device, such as the underwater rings in accordance with this invention, it is possible to completely solve the vibration problem by installing the rings only on a partial length of the cable-not along the full cable length. A distributed damper band system will be effective in eliminating significant vibrations in all vibration modes.

Damper bands of the present invention have been found to be very effective when applied to an existing cable stay in air using a pattern of bands placed along the cable at a spacing of preferably twice to four times the diameter of the cable. A similar spacing is effective underwater. Due to the density of water compared with air, it is possible for a cable in, for example an ocean current of 5 mph to vibrate similarly to a cable in air subjected to, for example, 50 mph winds. While a band spacing of two to four times the cable diameter will result in the use of a large number of bands, the number of these bands is nowhere near the number suggested in the prior art as being required for applications in air. The flexible or rigid bands can be installed effectively using uncomplicated techniques so that minimal disruption to the structure during damper band installation will occur.

Unlike prior proposed solutions, the cable stay damper bands of the present invention are not particularly conspicuous, do not require adjacent cables to be connected together, are durable and require essentially no maintenance, other than the possible need for removal of marine growth in the situation of underwater placement of the cable and bands. The damper bands are not apt to add a great amount of weight to the cable stays to which they are attached. Installation of the damper bands or rings in an underwater application is likely to benefit from the use of a robotic installation system—especially for any extreme depth installation. The cable stay damper bands, with or without active control, and their methods of use, in accordance with the present invention, in diverse situations overcomes the limitations of the prior art solutions. They represent a substantial advance in the art.

BRIEF DESCRIPTION OF THE DRAWINGS

While the novel features of the cable stay damper bands, with and without active control, and their method of use, in accordance with the present invention will be set forth with particularity in the appended claims, a full and complete understanding of the invention may be had by referring to the detailed description of the preferred embodiments, as will be set forth subsequently, and by referring to the accompanying drawings, in which:

DESCRIPTION OF THE PREFERRED EMBODIMENTS

Figure 1:
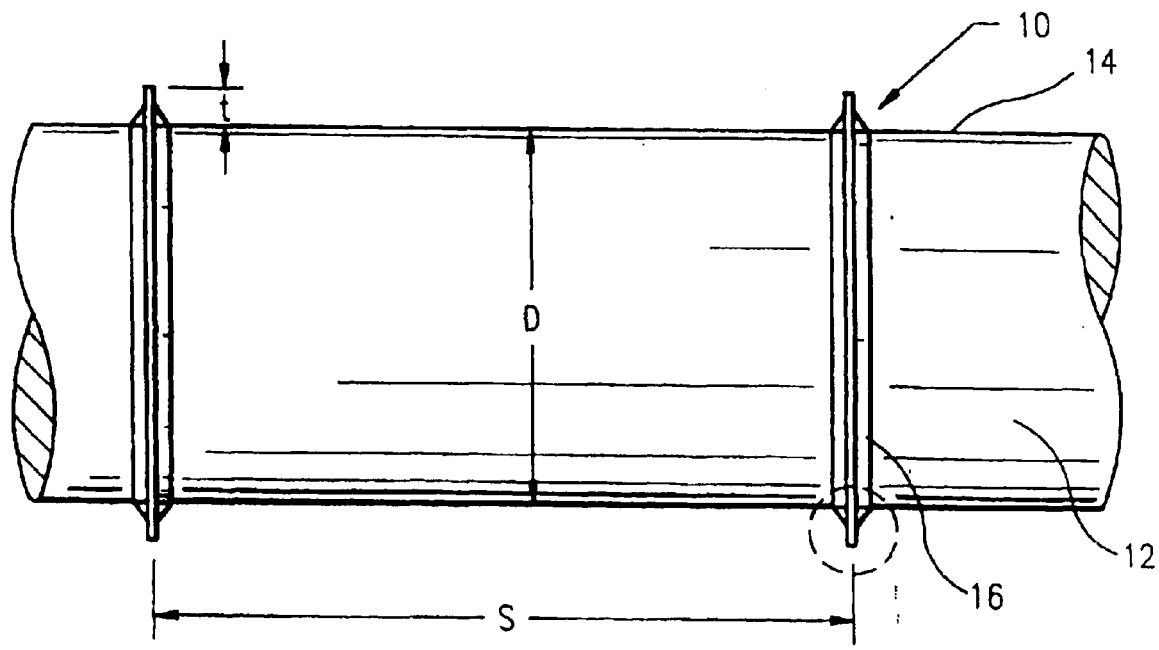
FIG. 1 is a side elevation view of a portion of a cable stay carrying damper bands in accordance with the present invention.

Referring initially to FIG. 1 there may be seen generally at 10 a first preferred embodiment of a fluid current induced cable stay vibration damper ring or band in accordance with the present invention. Damper band 10 is shown in place encircling a cable stay, generally at 12. It will be understood that cable stay 12 is very schematically depicted and is intended to be representative of a large variety of cable stays. It will be readily apparent that such cable stays 12 are typically not one solid piece of metal but instead are a compound arrangement of numerous strands of material and other materials wound together and are sometimes filled with a grout or mortar-type material. Since cable stay 12 forms no part of the subject invention, it will not be discussed in detail. Suffice it to say that cable stay 12 is either circular-shaped, with a cable diameter D, or elliptical-shaped, with a maximum cross-sectional dimension of D, and has a surface 14 which typically is not completely smooth but instead is a repeating pattern of helically extending peaks and valleys formed as the cable strands are wound together to form the resultant cable stay 12 or as durable pieces of tape are wound around the cables or the outer coverings, such as pipes, in which the cables may be contained.

Each cable stay damper ring or band 10 is embodied to be placed about an existing cable; i.e. is intended for either new or retrofit applications. Also, as will be discussed later in more detail, each cable stay damper band, such as band 10 may be either passive, acting solely in response to fluid flow with respect to the cable stay or cable to which it is secured, or active in anticipation of cable stay vibrations or oscillations. The first embodiment of the cable stay ring or band 10 has a flexible body 16 which, as seen most clearly in FIG. 2, may be generally triangular in cross-section. A projection 18 may extend away from the apex 20 of the sides 22 and 24 of the generally triangular band 16. The base 26 of the generally triangular shaped damper band 16 may include a resilient portion 28. This resilient portion 28 will compensate for dimensional variations in the surface 14 of the cable 12 to which the bands are secured, and will also provide a watertight seal. A suitable elastic membrane may be placed on the base 26 of the band 16 to provide the band resilient portion 28.

Figure 2:
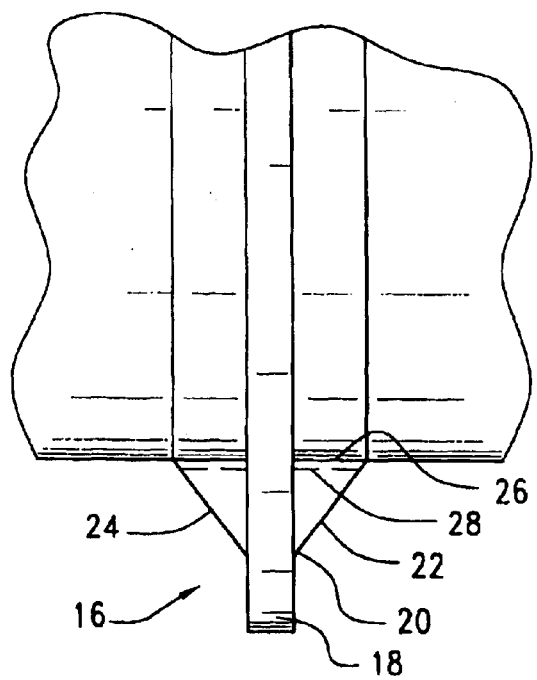
FIG. 2 is an enlarged view of the portion of the cable stay and damper band encircled in FIG. 1.

The damper ring or band 10 shown in FIGS. 1 and 2 is depicted having a generally triangular-shaped band body 16. It will be understood that this is representative of a number of band body cross-sectional shapes which could be used. The projection 18 on the band body 16 currently is felt to be instrumental in re-directing the fluid current flow along the length of the cable stay 12 to which the damper bands 16 are secured. However, it is also possible that the damper bands themselves, without the addition of the projections 18 will be effective in re-directing the fluid current flow along the cable 12.

The body 16 of each damper ring or band 10 is made of a suitable resilient, flexible material so that it will be able to be wrapped about the outer surface 14 of the cable stay 12 to which it is to be secured. The band has sufficient built-in tolerance or stretch so that it will form a tight compressive seal against the cable stay 12 whose diameter D is apt to vary slightly along its length. Any number of plastic or polymeric materials, which will exhibit the required built-in dimensional tolerances and which will tolerate long term exposure to harsh ambient or marine environments are suitable for use. For underwater applications, the material must be able to withstand tremendous forces due to intense pressures which result from the placement of the underwater cables to depths of over 6000 feet. At such extreme ocean depths, metallic materials may be required to withstand the pressure forces involved. The band may carry an elastic membrane as the resilient portion 28 that provides the watertight seal. In addition, elastic membranes may be placed at the ends 30 of the band body, as seen in FIG. 3.

Figure 3:
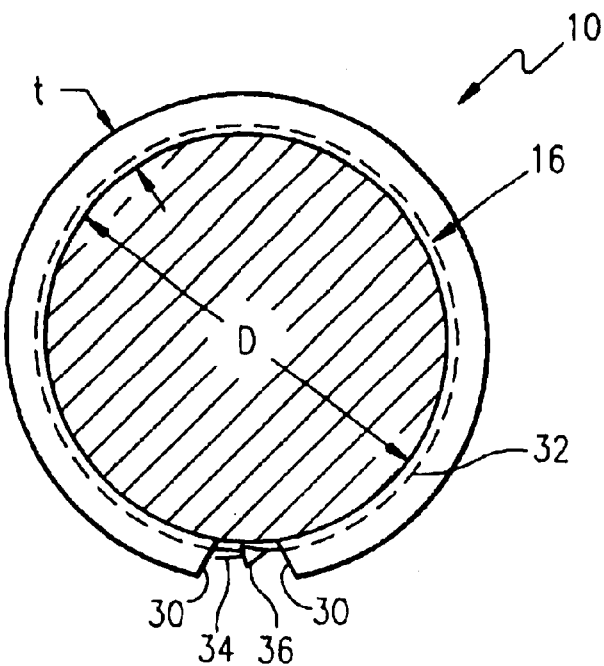
FIG. 3 is an end view of the cable of FIG. 1 showing a first embodiment of a passive damper band in accordance with the present invention.
Figure 4:
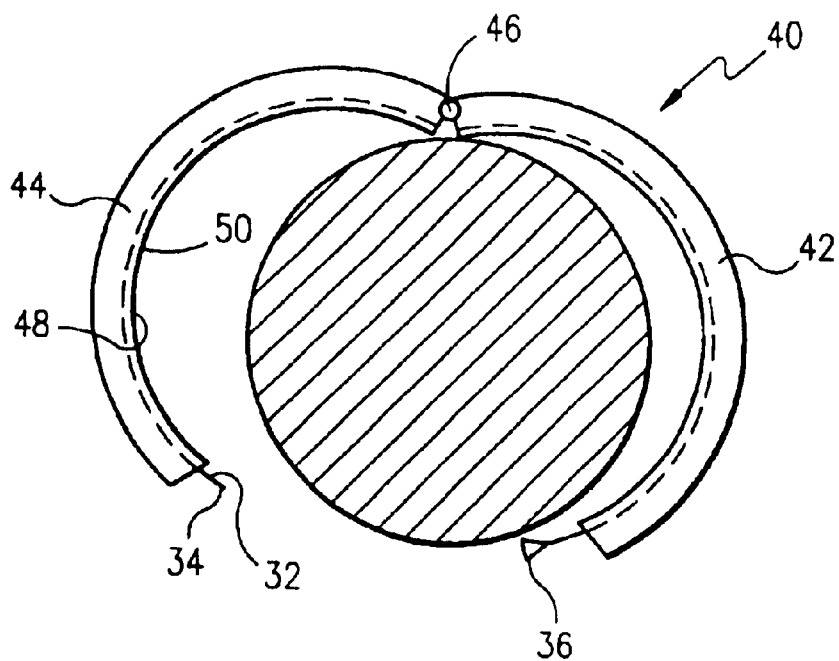
FIG. 4 is a view similar to FIG. 3 and showing a second preferred embodiment of a passive damper band of the present invention.

As is also shown in FIG. 3, which is not to scale, the damper band 10 is provided with an internally situated tension strap, generally at 32. This tension strap 32 is used to secure the band body 16 to the cable surface 14. This tension strap 32 can be plastic, metallic or of another suitable material that will produce a uniform, long term compressive hoop stress around the damper band body 16. This tension strap 32 is provided with a male end 34 and a female end 36, as seen in FIGS. 3 and 4. The tensioning strap 32 could be provided as a plastic wire tie, a metallic hose clamp or a similar elongated strap which will be embedded in, or pass along the body 16 of the damper band 10.

As indicated above, the drawings depicting the subject invention are not to scale. The size of the damper bands has been increased for purposes of illustration. It has been determined that the size of the damper band 10, with respect to the size of the cable stay 12 should be within certain ranges to produce the best results. The spacing S between adjacent damper bands 10, as seen in FIG. 1 is determined by the relationship of S or band spacing being between two and four times the cable stay diameter D in air applications. Thus, if the cable stay has a diameter of 4½ inches, the band spacing S should be between 9 and 18 inches, for a 2D to 4D spacing. Required ring spacing in water is generally similar. More lengthy spacings also may be effective. Each band body 16 has a thickness t, as also shown in FIG. 1. This thickness t should be selected to be in the range of between D/10 and D/20 in air applications. Again if the cable stay diameter is 4½ inches, the band thickness t should be between 0.45 inches and 0.225 inches, for a D/10 to D/20 band thickness. Required ring thickness in water is generally similar. Thinner thicknesses also may be effective.

Turning now to FIG. 4, there may be seen a second preferred embodiment of a fluid current induced cable stay vibration damper band, generally at 40, in accordance with the present invention. In contrast to the first damper band 10, which is made of a resilient, flexible material that will readily deform about the cable stay 12, the damper band 40, as shown in FIG. 4, may be made of a less flexible material. Two half circle band body segments 42 and 44 are secured to each other by a suitable hinge 46. These band body segments 42 and 44 must still exhibit sufficient resiliency to accommodate variations in the cable stay diameter D along the length of the cable stay 12. A watertight seal material 48 may again be placed along a base portion 50 of each of the band body segments 42 and 44. This watertight seal material may not be required in all situations. Its useage will depend on both the cable stay and the ring material. The tensioning strap 32 is also provided, in the same manner as was discussed previously in connection with damper band 10. The radially outwardly extending projection 18 described in connection with the first preferred embodiment 10, is not shown in the second embodiment 40. However, it is to be understood that this is for reasons of clarity. The projection 18 of band 10 could also be used with band 40. The hinge 46 for use with an underwater cable stay damper band 40 could be as simple as a so-called living hinge or could be a more traditional hinge, depending on the size of the band body of the damper band 40. As was the case with the first preferred embodiment 10, the cross-sectional shape of the body of the damper band 40 can also be varied to suit the specific application. In both of these preferred embodiments, as well as in the several to be discussed shortly, the band body 16 or the band body segments 42 and 44 do not have to extend 360° around the surface 14 of the cable stay 12.

Figure 5:
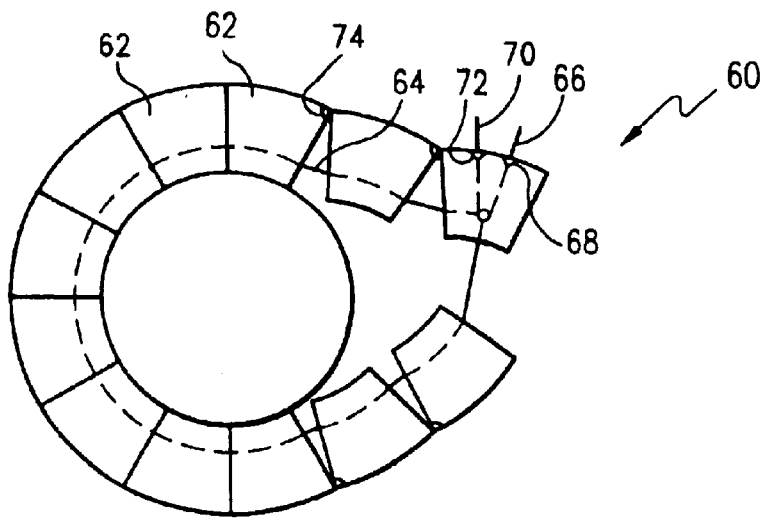
FIG. 5 is a side elevation view of a third preferred embodiment of a passive cable stay damper band having a multi-segmented body.
Figure 9:
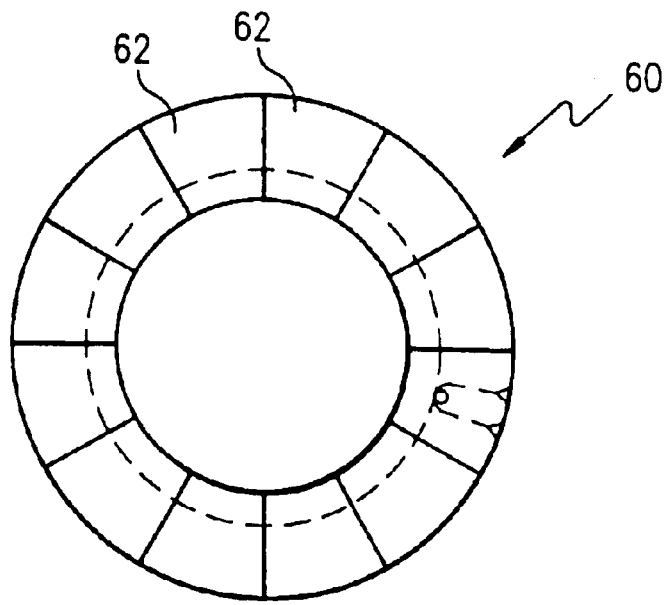
FIG. 9 is another view of the fluid current induced, cable stay vibration damper band of FIG. 5 now secured in place on a cable.

A third preferred embodiment of a fluid current induced cable stay vibration damper band, in accordance with the present invention, is shown generally at 60 in FIGS. 5 and 9. In this third preferred embodiment, the damper band 60 is comprised of a plurality of band body segments 62. If, for example, a projection member, which is not specifically shown, is to be used with the damper band, and is to be made of metal, the band body segmented construction of FIGS. 5 and 9 will be advantageous. In this third embodiment, the watertight seal providing material is not specifically depicted and may not be required in all applications. As was the case with the previously described embodiment, this seal material will be usable to produce a good seal against the surface 14 of the cable stay 12. The damper band 60 also has built-in tolerance allowances for slight changes in the cable stay diameter along the length of the stay. These can be accomplished by the provision of an elastic material on the end faces of the two band body segments 62 which will abut each other after the band has been placed about the cable stay. A suitable tension strap 64 is embedded in, or carried in the several band body segments 62. This tension strap can be anchored at a first end 66 to a suitable anchor 68 and can have a second end 70 that will be receivable in a strap tightening fixture 72. This tension strap 64 and its anchor 68 and strap tightener 72 will be similar to the corresponding structures described in connection with FIGS. 3 and 4.

The several band body segments 62 are connected together by a top linkage assembly, generally at 74. The top linkage assembly 74 resists the outer pull-out force resulting from the tension strap 64 and holds the band body segments 62 in their correct orientation as the damper band 60 is placed about the cable stay 12 and the tension strap free or second end 70 is fed through the strap tightener 72. Once the tension strap 64 has been tightened, the end or ends projecting out beyond the body segments can be cut off.

Figure 6:
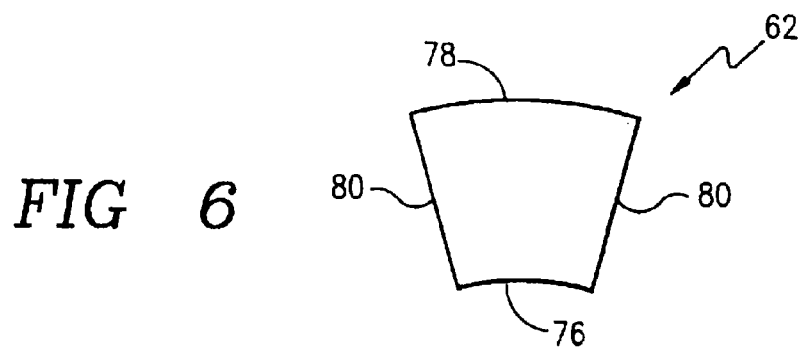
FIGS. 6–8 are side elevation views of different segment shapes useable in the damper band of FIG. 5.

In the configuration shown in FIGS. 5 and 9, each of the band body segments 62 is generally trapezoidal in side view. This shape for a single band body segment 62 is shown in FIG. 6. As may be seen there, the body segment 62 has somewhat arcuate inner and outer surfaces 76 and 78, respectively. The radial side walls 80 are generally planar. The overall shape is generally similar to a keystone.

Figure 7:
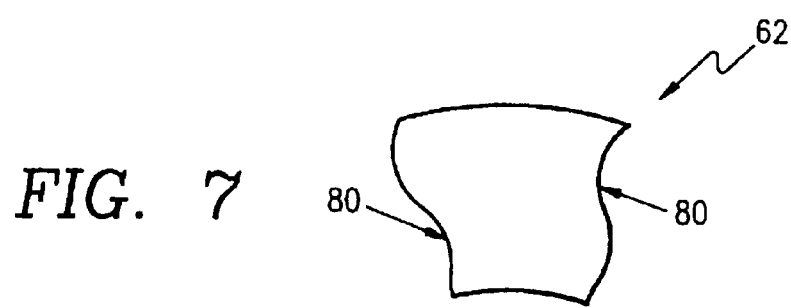
Figure 8:
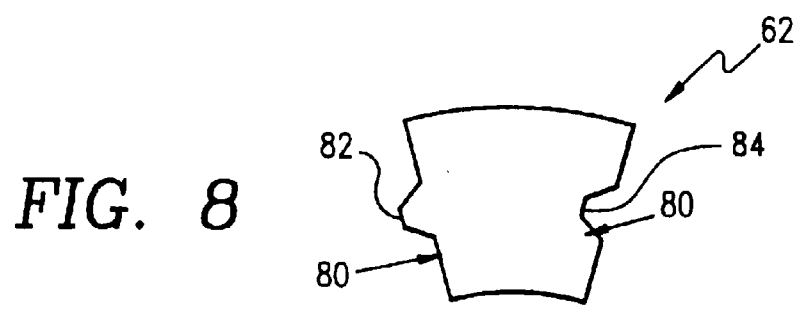

Alternative shapes for the band body segments 62 are shown in FIGS. 7 and 8. In both of these, the two radical walls 80 of each segment 62 are shaped to engage the adjacent radial wall of the next adjacent band body segment 62. In FIG. 7, there are shown somewhat sinusoidal radial walls 80. In FIG. 8 the radial walls have a cooperating shear key shape in which one radial wall 80 of each segment has a key 82 and the other radial wall 80 has a keyway 84. It will be understood that other cooperating radial wall shapes are also within the scope of the present invention.

Figure 10:
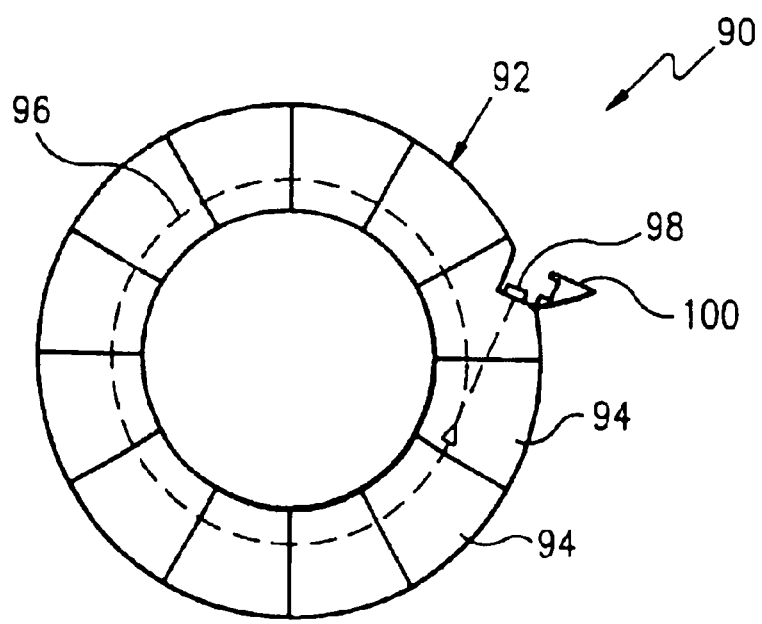
FIG. 10 is a view similar to FIG. 9 of a fourth preferred embodiment of an fluid current induced, cable stay vibration damper band of the present invention.

A fourth preferred embodiment of a fluid current induced cable stay vibration damper band in accordance with the present invention is shown generally at 90 in FIG. 10. In this fourth preferred embodiment, the damper band 90 has a band body 92 comprised of a plurality of similarly shaped band body segments 94, which are generally the same as the band comprising segments 62 discussed in connection with the third preferred embodiment 60. In this fourth preferred embodiment 90, the tensioning strap 96 is tightened by a bolt 98 in a manner generally analogous to a hose clamp, as was discussed in connection with the first embodiment. A suitable removable anchor cap 100 is provided so that the bolt head of the bolt 98 can be covered once the damper band 90 has been placed on the cable stay.

Figure 11:
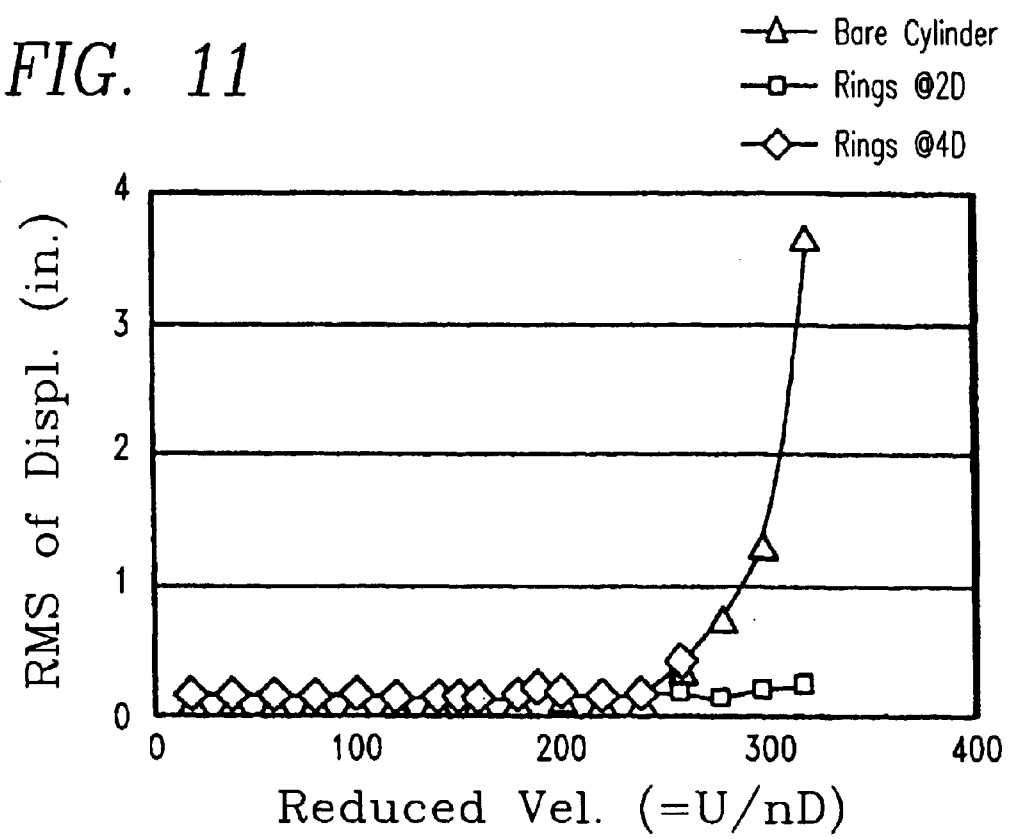
FIG. 11 is a graphical depiction of a wind induced cable stay vibration without and with the damper bands similar to the present invention.

FIG. 11 demonstrates the effectiveness of passive cable stay damper bands, in air, in accordance to the present invention, for reducing the vibrations in a cable stay which are apt to occur at higher wind velocities. Similar results are provided by underwater cables at relatively low underwater current speeds. As may be seen in FIG. 11, when the wind velocity increases to generally in the area of 50 MPH, i.e. to approximately 240 units as represented on the x-axis of the graph, the cable vibration created by this wind increases dramatically. The addition of the damper rings or bands of the present invention, again at a spacing of approximately two to four times the cable stay diameter will essentially eliminate these vibrations. Thus it can be seen that the passive retrofitting of an existing cable, or the installation on a new cable of the passive fluid current induced cable stay vibration damper bands in accordance with the present invention, and at the approximate spacing and size discussed above, is likely to be very effective in the virtual elimination of fluid current induced cable stay vibrations.

The rings or bands presented in FIGS. 1–11 are generally passive in nature since they are secured to the cable stays of a bridge or of an off-shore marine structure and depend on their fluid-dynamic shape to mitigate cable stay vibrations which are caused by fluid currents. The present invention also provides active devices and control systems, which incorporate and utilize the benefits of the passive fluid damper rings or bands, and that will even more effectively dampen fluid current induced cable stay vibrations.

Figure 12:
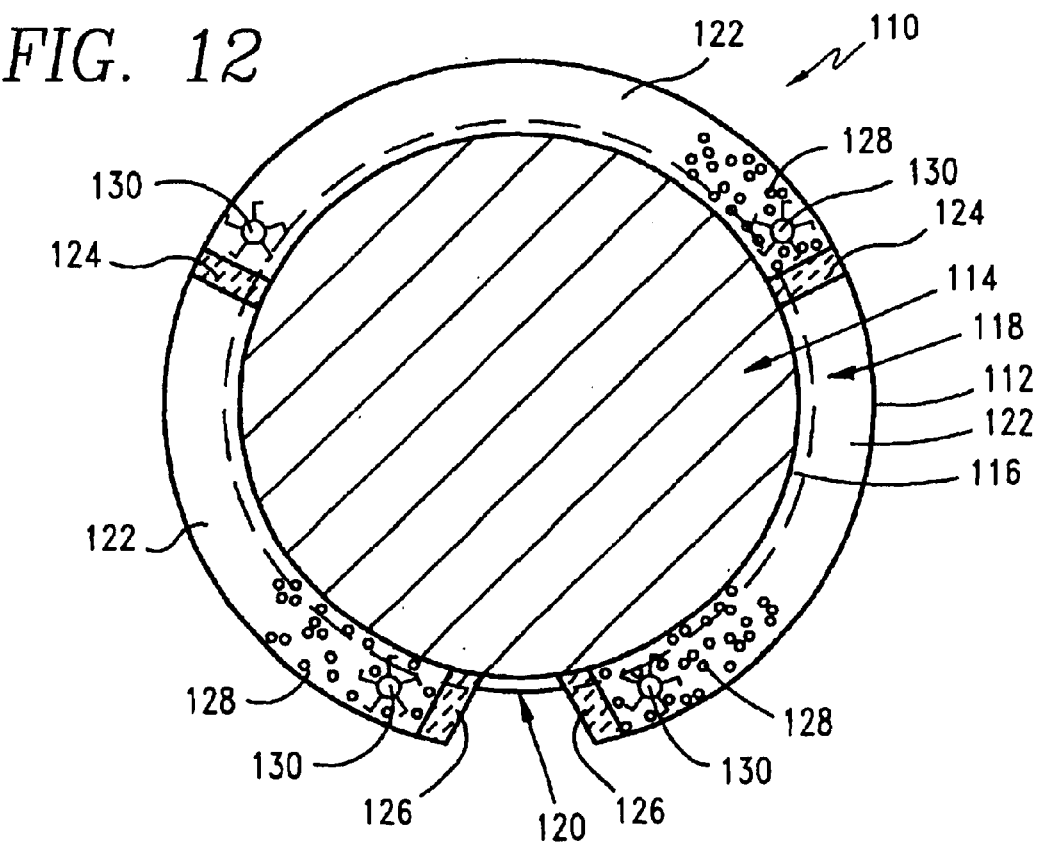
FIG. 12 is a cross-sectional schematic view of a preferred embodiment of an active fluid current induced vibration damper band or ring with a shiftable mass in accordance with the present invention.
Figure 13:
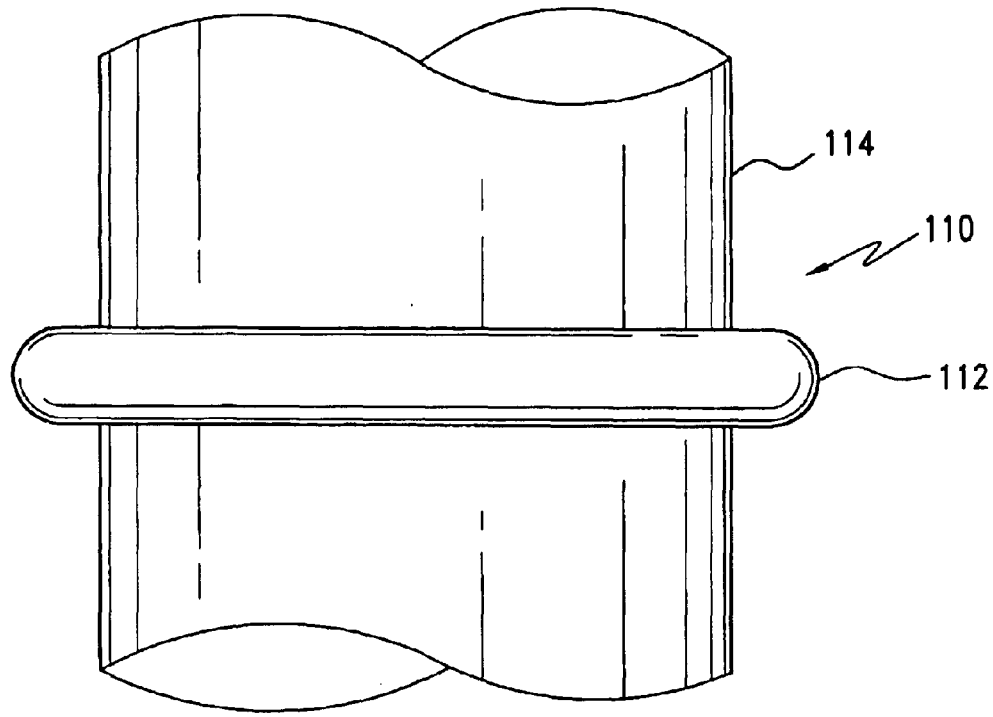
FIG. 13 is an elevation view of the cross-section shown in FIG. 12.

Referring now to FIG. 12, there may be seen generally at 110 a first preferred embodiment of an active fluid current induced vibration damper band in accordance with the present invention. This active damper band 110 is similar in overall shape to the passive damper bands described previously. A flexible ring or band 112 is securable about the outer circumference of a cable stay 114. An integral securement strap or other suitable securement device 116, which is depicted in dashed lines in FIG. 12, is incorporated in, or is inserted through the hollow interior portion 118 of the flexible band 112. Ends of the securement straps 116 are connected to each other as schematically depicted at 120 in FIG. 12. It will be understood that the flexible ring 112 can be made of any suitable plastic or similar flexible resistant material which is resistant to ambient air or underwater induced deterioration and that the securement straps 116 could be a wire tie or another similar type of quick connecting device that would lend itself to quick field assembly, either by manual or by mechanical means. FIG. 13 shows a side elevation view of the active fluid current induced vibration damper band that is shown in cross-section in FIG. 12.

The hollow interior 118 of the flexible ring 112 of the first preferred embodiment of the active damper band in accordance with the present invention, is preferably divided into several shiftable mass receiving chambers, with three such chambers 122 being depicted in FIG. 12. A pair of interior barriers 124 and two end barriers 126 are positioned in the interior 118 of the flexible band or ring 112 to define the separate shiftable mass receiving chambers 122.

Each shiftable mass receiving chamber 122 is partially filled with a shiftable mass 128. This shiftable mass 128 is preferably a viscous fluid or another flowable material that can shift locations in its shiftable mass chamber 122 either reactively; i.e. solely due to movement of the damper band, or proactively by utilization of energizing devices. The free space within each chamber 122 can be either filled with air, a fluid, or can be maintained under a vacuum. A suitable energizing device 130, or several such energizing devices 130 can be placed in each of the shiftable mass chambers 122, as may be seen in FIG. 12. Each such energizing device 130 could be a small impeller driven by an electrically powered micro motor which is not specifically illustrated. As will be discussed shortly, if the system is a smart proactive system, the energizing devices 130 will be controlled for selective operation to shift the shiftable mass 128 in each chamber 122 so as to counteract the movement of the cable stay. If the shiftable mass 128 is moved reactively; i.e. solely as a result of the shifting of the cable stay, it will still tend to counteract the shifting or oscillating movement of the cable stay. For example, if the cable stay 114 depicted in FIG. 12 is caused by fluid currents, to shift to the right, the shiftable mass 128 in chamber 122 will tend to travel to the left side of the upper chamber 122. If the damping system is an energized, proactive system, the energizing device 130 at the right end of the upper chamber 122 can be activated to more rapidly shift the shiftable mass 128 from the right side of the upper chamber 122 to the left side of the upper chamber 122. If the system is an energized, proactive smart system, only selected ones of the energizing devices 130 may be operated with the decision of which energizing devices 130 to be operated depending on which cables stays are vibrating, as well as the magnitude of each vibration. The result, whether the shiftable mass is caused to move reactively, by reacting to the movement of the cable stay, or proactively, as a result of the operation of the energizing device 130, is to dampen the cable stay oscillations. The energizing devices 130 will preferably be electrically powered through suitable electric leads that are not specifically shown in FIG. 12 of the drawings.

Figure 14:
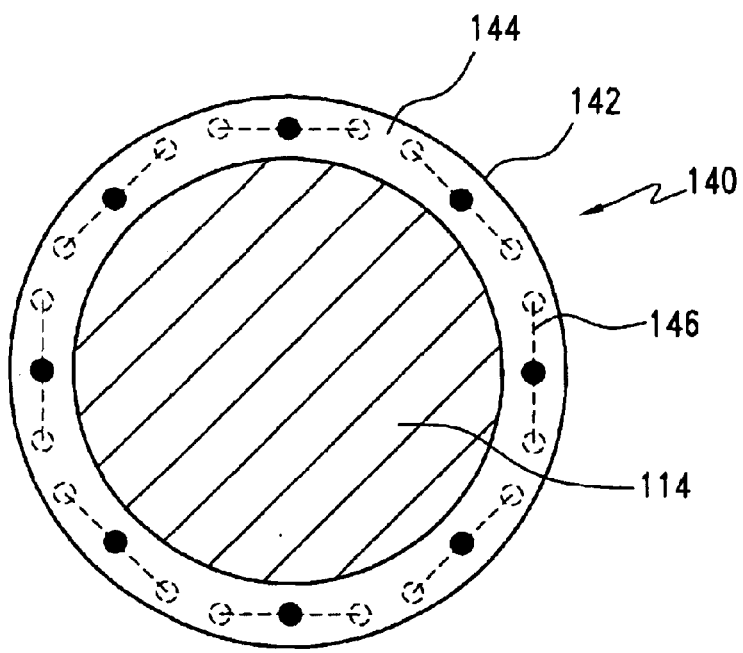
FIG. 14 is a cross-sectional schematic view of a second preferred embodiment of an active damper band or ring with a shiftable mass.
Figure 15:
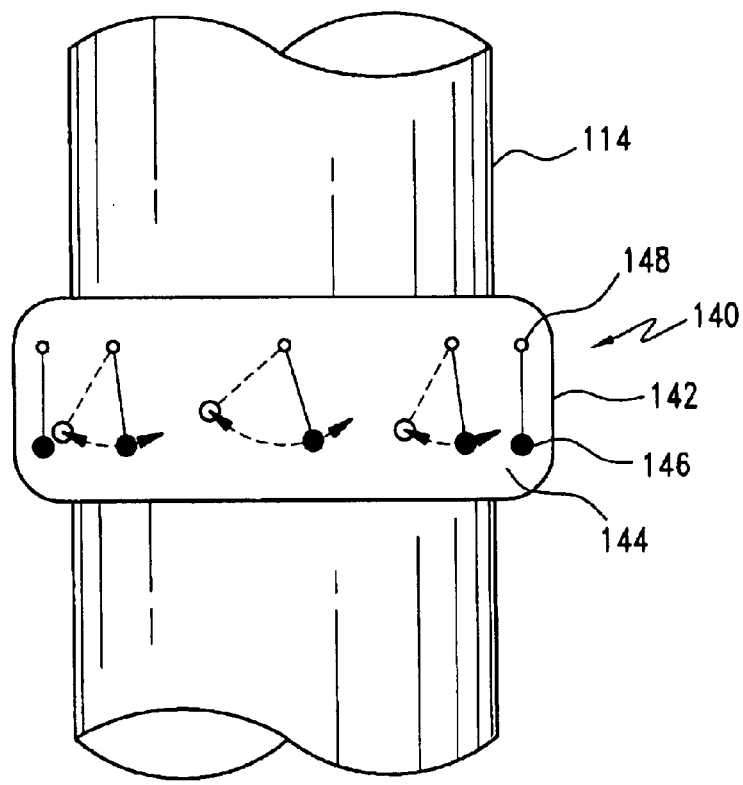
FIG. 15 is an elevation view of the cross-section shown in FIG. 14.

Turning now to FIGS. 14 and 15 there is shown, generally at 140 a second preferred embodiment of an active damper band or ring in accordance with the present invention. This active damper band 140 is again secured about an outer surface of a cable stay 114 and has a shape similar, though wider, to the flexible ring 112 described in connection with FIG. 12. This damper band 140 can be comprised of several hinge-connected sections, or can be fabricated as a single ring of a suitable metal or other material, as shown in FIGS. 13 and 14. The circular body 142 of the damper band 140 is provided with a hollow, interior area 144. A shiftable mass is provided in the interior chamber 144 formed in the band body 142 of the second preferred embodiment 140 of the active damper band in accordance with the present invention. This shiftable mass takes the form of one or a plurality of pendulums 146, each of which is supported for pivotable movement by a support shaft 148. As was the case with the first embodiment 110 of the active damper band described previously, the shiftable mass; i.e. the pendulum or pendulums 146 placed in the interior chamber 144 of the band body 142 of the second preferred embodiment 140 of the active damper band can be excited either reactively as a result of a response to shifting of the cable due to fluid current induced oscillations, or can be positively energized. In the latter situation, the pendulum supporting shaft or shafts 148 are the energizing mechanism and can be caused to pivot by suitable electrically operated devices, such as micro motors, that are not specifically shown. If the system is an active smart system, again as will be discussed shortly, the energizing mechanisms can be caused to shift the pendulum or pendulums in advance of a shifting or a similar movement that the cable or cable stay 114 is sensed to be about to make. In this second active embodiment, as in the first active embodiment, the shiftable mass is shifted in a direction in opposition to the movement of the cable stay to which the active damper band is attached. Such a proactive, opposing shifting of the shiftable mass 128 or 146 in the active damper band 112 or 142, respectively, will dampen the oscillation of the cable stay 114.

Figure 20:
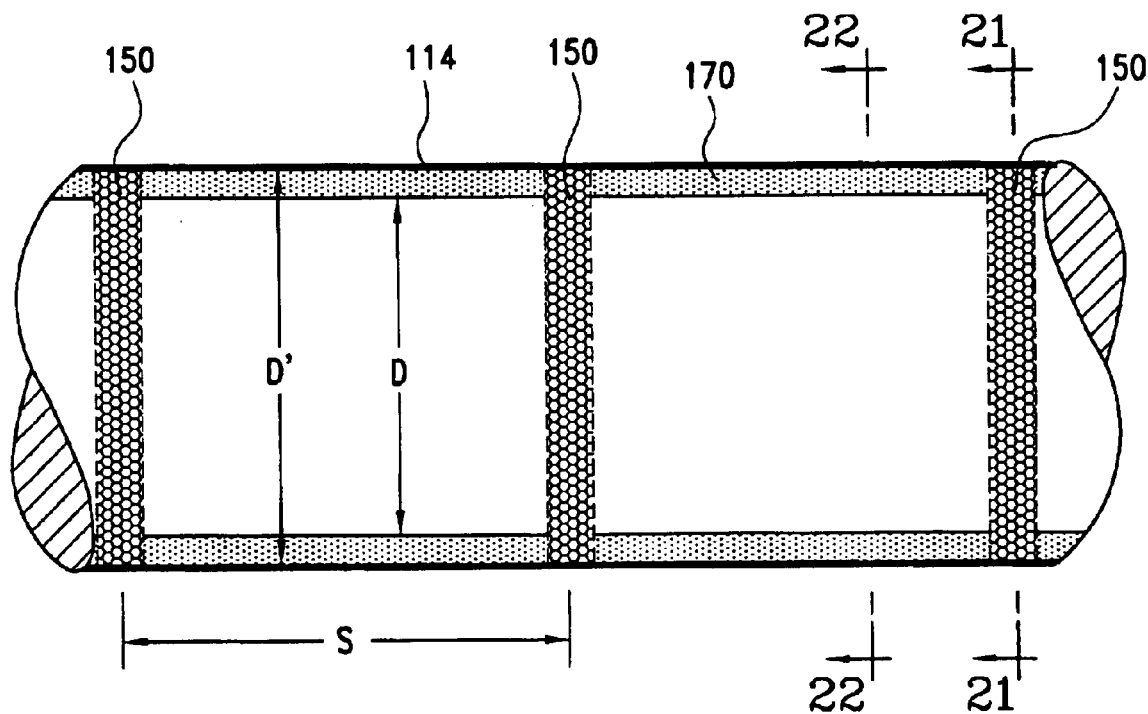
FIG. 20 is a side elevation view, generally similar to FIG. 1 and showing active rings placed in the interior of a cable stay, producing a "smooth" cable stay outer surface.

In both of the two embodiments of an active damper band discussed above, the bands are placed on the exterior surface of the cable or cable stay 114. This is primarily a retrofit arrangement, or one where an accomplishment of fluid damping is important in conjunction with the damping provided by the shiftable mass. In new construction, the shiftable mass could be placed interiorly of the cable stay. Since a cable stay is typically a sheath that is placed about a group or bundle of individual cables and in which void areas are filled with a settable material, it is possible to place the active damper bands 150 within the cable stay 114 as shown in FIG. 20. While this may lead to a slightly increased overall cable stay diameter D, it preserves a smooth exterior surface that is less apt to experience marine growth, ice build-up or airborne debris retention. Of course, the location of the damper bands 150 inside the cable stay 114 will eliminate any fluid-dynamic benefit that is provided by exteriorly mounted damper bands, as discussed previously. In such a situation of interior bands 150 and shiftable masses, reactive or proactive control of the shiftable masses and particularly proactive smart control of the shiftable masses becomes the mechanism by which oscillations of the cable stay 114 are counteracted.

The most effective damping of cable stay vibration and oscillations may well entail some combination of the several mechanical and fluid-dynamic devices discussed above. For instance, it may well be that a solution could include an exteriorly positioned active damper band having a fluid-dynamic shape. The damper band could include right and left chambers such as chambers 122 discussed in connection with the damper band 110 of FIG. 12, with their shiftable masses 128 and included paddle wheel type energizing devices 130. A pendulum 146 or a plurality of pendulums 146, as shown in FIGS. 14 and 15 could also be incorporated into the same active damper band. The shiftable masses 128 on the left and right sides of the damper band 110 would control vertical oscillations of the cable stay 114. It is quite possible that no operation of the energizing devices such as the paddle wheels 130 would be required with acceleration forces of $\geq 1$ g. If the acceleration is $\leq 1$ g the energizing paddle wheels 130 may be used. Similarly, if the pendulum or pendulums 146 are to be effective at accelerations $\leq 1$ g, it is quite likely that the energizing device for the pendulum or pendulums 146, such as the rotatable pendulum support shaft 148 may be required to be operated.

Figure 16:
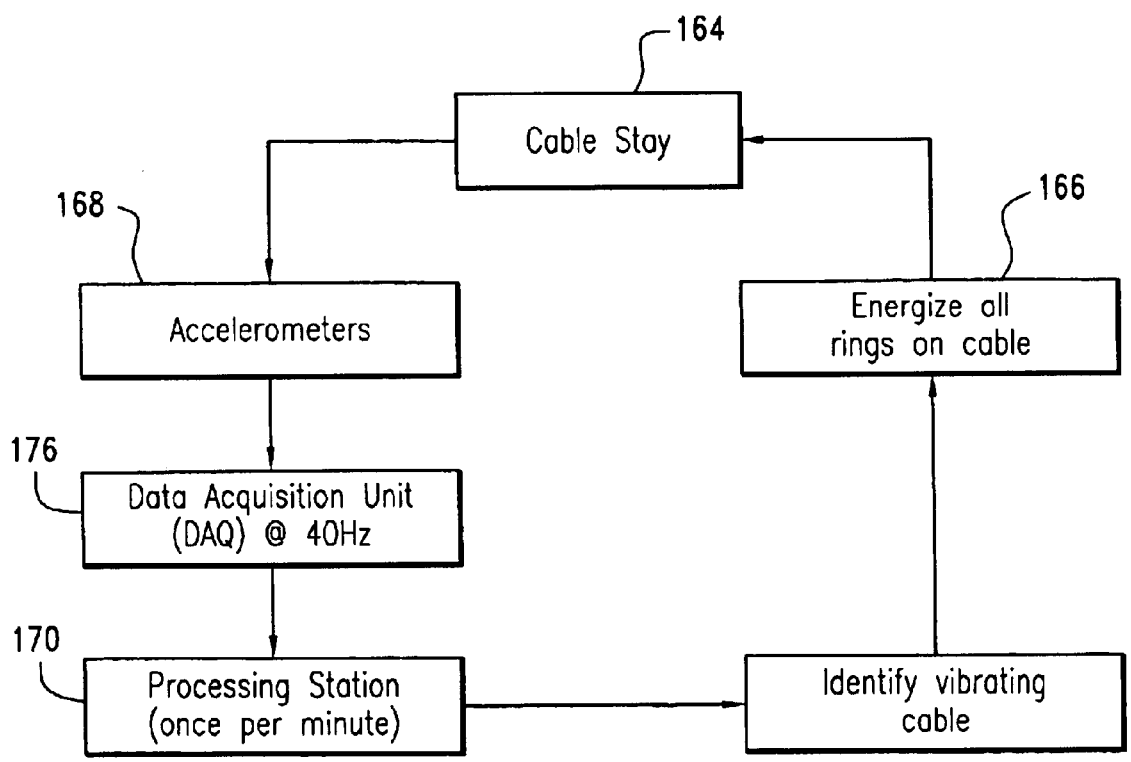
FIG. 16 is a block diagram of an active control system for a shiftable mass dampening system in accordance with the present invention.
Figure 17:
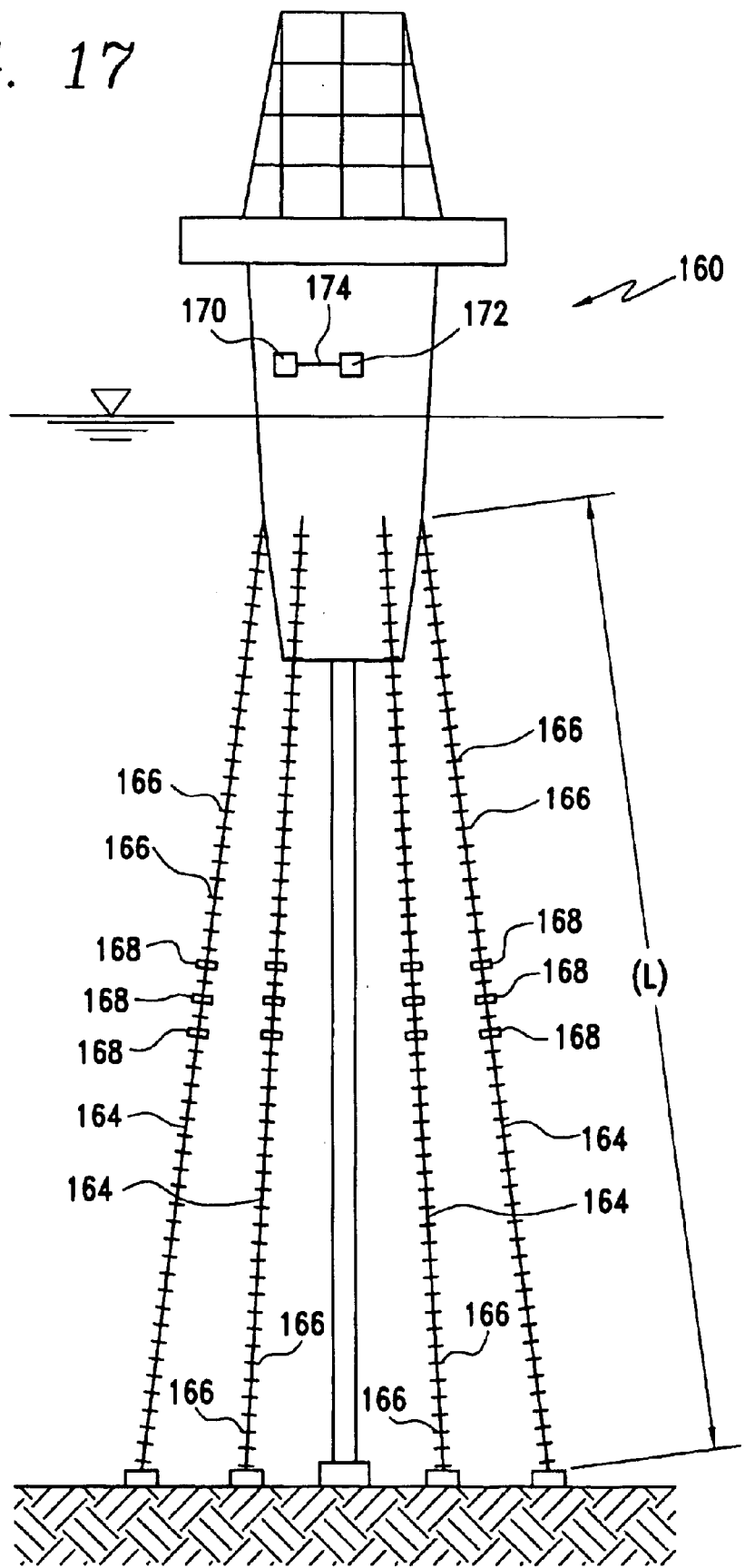
FIG. 17 is a schematic side elevation view of a portion of an off-shore oil platform with active or passive underwater damping rings on the supporting cable stays.

Turning now to FIGS. 16 and 17 there is schematically depicted what will be referred to a proactive system that is useable to counteract and to dampen fluid current induced vibrations and oscillations in the underwater cable stays of an off-shore platform generally at 160. While the system is discussed in connection with water current induced vibrations in the cable system for an off-shore oil platform, it is equally applicable to the mitigation of air current induced vibrations in a bridge cable, tower guy wire or the like. Referring initially to FIG. 17, there is schematically depicted a portion of an off-shore oil platform, generally at 160. The platform 160 is constructed with a plurality of cable stays 164. These cable stays 164 are shown as being provided with a number of active damper bands 166 spaced along the lengths of each of the cable stays 164 in accordance with the spacing parameters discussed in detail previously. This cable damper band spacing is preferably approximately two to four times the cable stay diameter, or 2D to 4D. Several of the active damper bands 166 are also provided with embedded accelerometers. These accelerometer bands are denoted at 168 in FIG. 17. The damper bands 166 and 168 are all electrically connected to a remote processing station 170 by suitable leads which are not shown in detail. The remote processing station 170 is joined to a central power communication and processing station generally at 172 by suitable power and communication lines 174. In operation in the proactive mode, as shown in the schematic diagram of FIG. 16, the accelerometer receiving bands 168 will sense oscillations, vibrations or other movement in the cable stay 164 to which they are attached. It will be understood that the damper bands 166 of the present invention are typically attached to all or the bulk of the cable stays 164, as depicted in FIG. 17. The accelerometers 168 provide their readings to the remote processing station 170 which includes a suitable data acquisition unit 176, as shown in FIG. 16. The data is received by the remote processing station 170, and is transferred to the central processing station 172. The particular cable stay or cable stays 164 which are being caused to oscillate are identified. In response, all of the active damper bands 166 on the particular cable stay or cable stays 164 are energized. This results in a shifting of the shiftable masses in each of the damper bands 166. As discussed previously, the operation of the energizing devices, either 130 or 148 may occur at cable stay acceleration levels only within specific ranges. If the cable stays 164 are being subjected to acceleration forces above 1 g, for example, the operation of the energizing devices may be unnecessary. The forces imparted to the shiftable masses by these high cable stay acceleration forces will likely be sufficient to properly shift the shiftable masses to counteract the cable stay oscillations without the assistance of the energizing devices. If the cable stay oscillations, as measured by the accelerometer carrying damper bands 168 is below, for example 1 g, then it may be appropriate to operate the energizing devices 130 or 148 to aid in the dampening movement of the shiftable masses 128 or 146.

Figure 18:
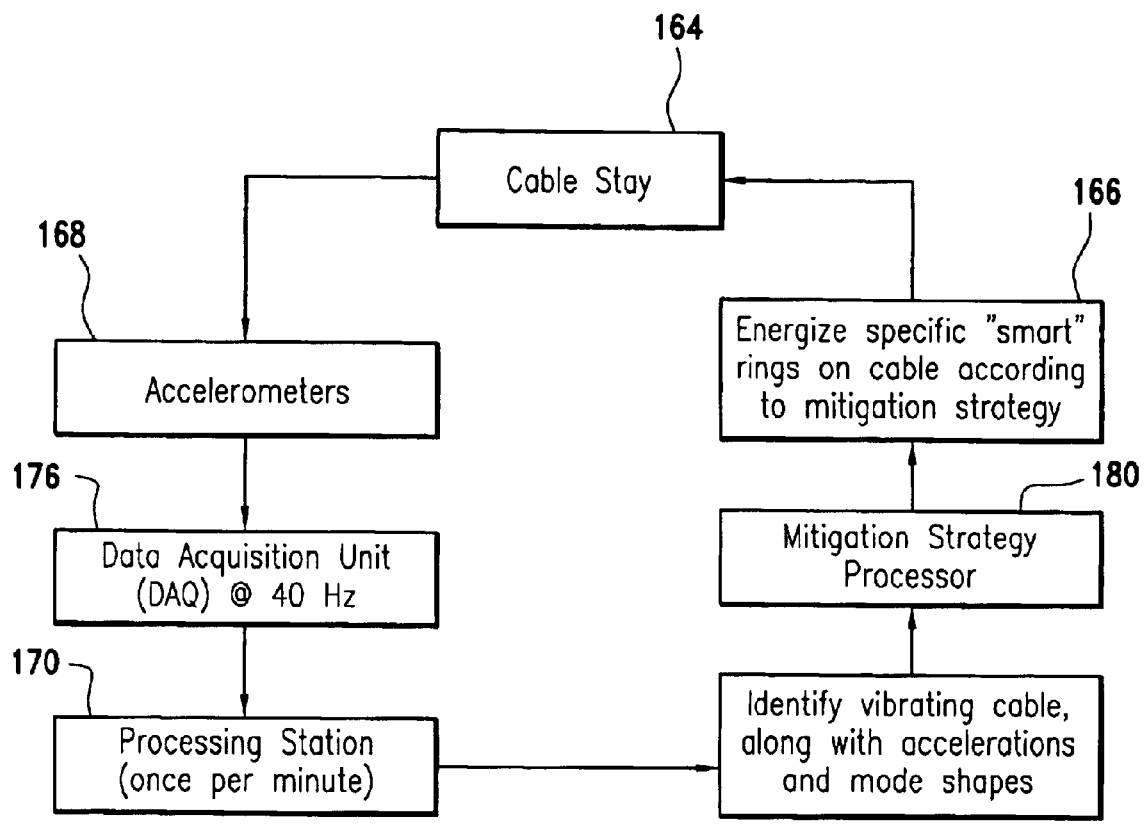
FIG. 18 is a block diagram of an active smart control system for a shiftable mass damping system.
Figure 19:
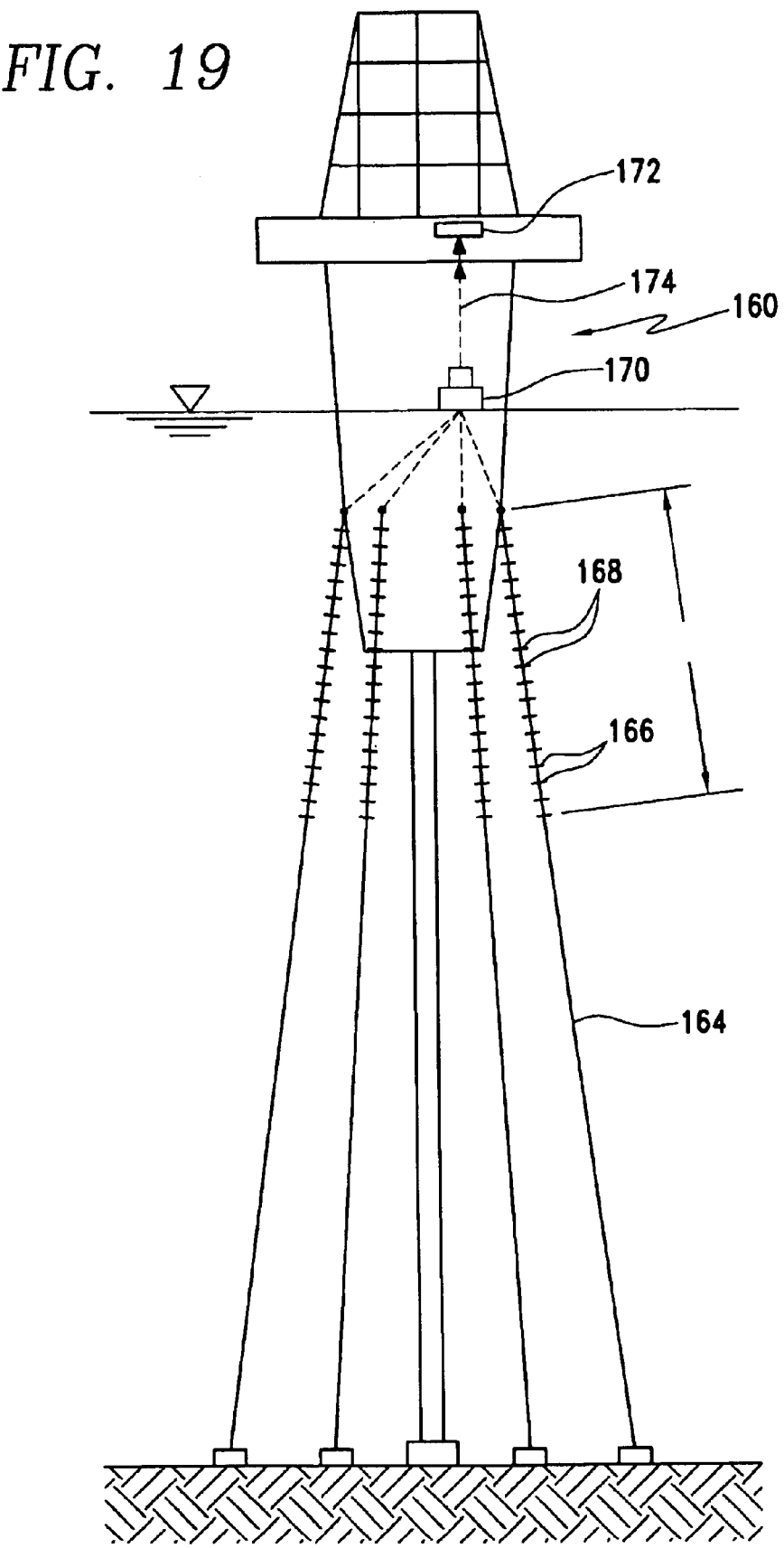
FIG. 19 is a schematic side elevation view of a portion of an off-shore oil platform with a plurality of smart active or passive underwater damping rings arranged on a plurality of cables.

A more sophisticated, smart active or proactive system of cable stay oscillation damping, in accordance with the present invention, is depicted in FIGS. 18 and 19 in which similar structures are identified by the same reference numerals. In this smart active system, the central power communication and processing station 172 is able to energize selected ones of the smart active rings 166 on individual cables 164, again based on readings provided by special accelerometer bearing ones 168 of the active damper bands 166 that are mounted on the plurality of cable stays 164. Since the smart proactive system is more effective in damping cable stay oscillations, it is possible that the active damper bands 166 will need to be placed on only the upper third or fourth of the length of the longer cable stays, as depicted schematically in FIG. 19. Similarly, since the smart proactive system will be more effective than the active or proactive only system, it is likely that a damper band spacing of four times the cable stay diameter, or 4D may be sufficient.

As shown in the schematic diagram of FIG. 18, the cable stay oscillations are sensed by the accelerometer carrying active damper bands 168 and the data is sent to the central processing station 170. In the smart proactive system, a mitigation strategy processor 180 is included in the central processing station 170. This processor 180 reviews the input from the accelerometer carrying active damper bands 168 and implements a strategy of activation of energizing devices in selected ones of the active damper bands 166 in a manner that will be most effective in eliminating cable stay oscillations. It is a requirement of such a smart proactive system that each damper band 166 would be specifically identifiable to the controlling system and would be individually and particularly energized for damping, where needed.

FIG. 20, as discussed above, shows the actively-controlled damper bands or rings 150 to be embedded within the cable stays 114. Such an arrangement, though requiring a larger overall cable diameter, D' maintains a smooth outer surface of the cable stay.

Figure 21:
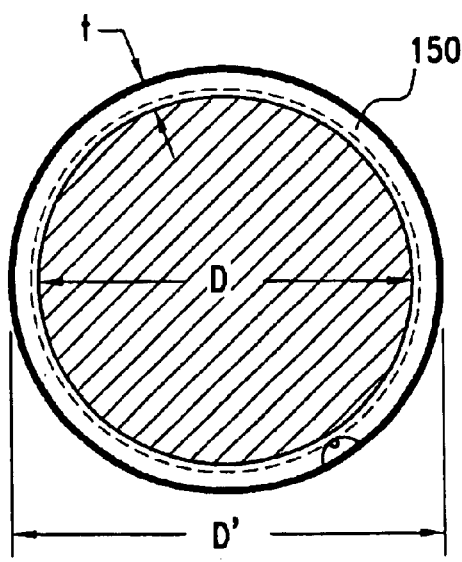
FIG. 21 is a cross-section of FIG. 20 taken along line 21—21.
Figure 22:
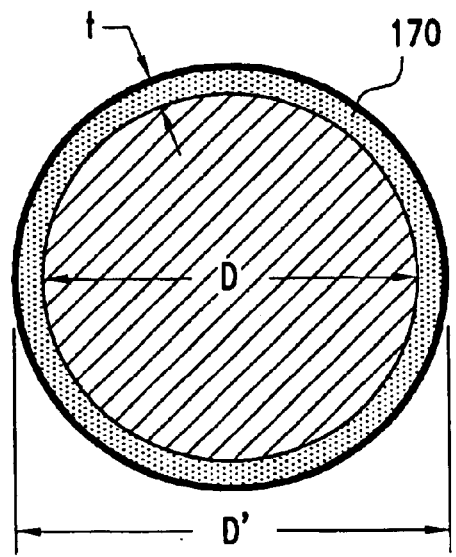
FIG. 22 is a cross-section of FIG. 20 taken along line 22—22.

FIG. 21 shows the cross-section of the damper band, while FIG. 22 shows the cross-section between the bands. Between the bands and around the "effective" portion of the cable stay, a grout, wax or other settable material 170 is likely to be required.

A device and a method for the damping of fluid flow induced vibrations in cable stays exposed to air or water currents, and using active and passive devices, has been set forth fully and completely hereinabove. The devices are well suited for use with active control technology and are effective in damping cable stay oscillations. It will be apparent to one of skill in the art that various changes in, for example the specific sizes of the cable stays and of their associated damper bands, the particular bridge or platform structures, and the like could be made without departing from the true spirit and scope of the present invention which is accordingly, to be limited only by the appended claims.

What is claimed is:

1. A cable damping device comprising:

a cable damper band adapted to be positioned about a cable subject to fluid current induced vibrations, said cable damper band having a hollow interior;

a shiftable mass supported for movement in said hollow interior of said cable damper band, said shiftable mass being shiftable in said hollow interior of said cable damper band to dampen said fluid current induced vibrations of the cable; and an energizing device positioned in said cable damper band and being operable to effect said shifting of said shiftable mass in said hollow interior of said cable damper band.

2. The cable damping device of claim 1 wherein said cable damper band includes a plurality of shiftable mass receiving chambers.

3. The cable damping device of claim 2 wherein each of said shiftable mass receiving chambers includes at least one of said energizing devices.

4. The cable damping device of claim 1 wherein said shiftable mass is a viscous fluid.

5. The cable damping device of claim 2 wherein said energizing device is a rotatable paddlewheel.

6. The cable damping device of claim 1 wherein said shiftable mass is at least one pendulum.

7. The cable damping device of claim 6 wherein each said at least one pendulum is supported for movement by a pendulum support shaft.

8. The cable damping device of claim 7 further wherein said energizing device includes means to rotate each said pendulum support shaft.

9. The cable damping device of claim 1 wherein said cable damper band is provided with an aerodynamic outer shape.

10. A method for controlling fluid current induced cable vibrations including:

providing a cable damper band having a hollow interior;

positioning a shiftable mass and a shiftable mass energizing device within said hollow interior;

securing said cable damper band about a cable subject to fluid current induced vibrations;

sensing vibrations in the cable;

actuating said shiftable mass energizing device in response to said sensed vibrations in the cable; and using said energizing device to shift said shiftable mass in said hollow interior of said damper band to counteract said vibrations in the cable.

11. A cable damper band comprising:

a damper band body, said damper band body being positionable on a surface of a cable subjected to fluid current induced vibrations, said damper band body being sized to at least partially encircle a cable and having a band body shape, said damper band body further including active means supported for movement in said damper band body and movable in said damper band body in response to said fluid current induced vibrations for reducing said fluid current induced vibrations in a cable;

a cable damper band base formed on said cable damper band body and adapted to engage a surface of a cable to which said cable damper band body is secured; and means for securing said cable damper band on a cable.

12. The cable damper band of claim 11 wherein said band body shape provides additional means for reducing said fluid current induced vibrations.

13. The cable damper band of claim 11 wherein said damper band body includes at least one interior chamber having a shiftable mass, said shiftable mass forming said active means.

14. The cable damper band of claim 13 further including at least one energizing device to shift said shiftable mass.

15. The cable damper band of claim 14 further including a control system operable with said energizing device to effect shifting of said shiftable mass.

16. The cable damper band of claim 15 further including an accelerometer in said cable damper band and being in communication with said control system.

* * * * *